June 9, 1964 R. G. PRONGAY 3,136,672

PRINTING PLATE AND METHOD OF MAKING THE SAME

Filed Aug. 28, 1961

INVENTOR.
Robert G. Prongay
BY
Bacon & Thomas
ATTORNEYS

United States Patent Office 3,136,672
Patented June 9, 1964

3,136,672
PRINTING PLATE AND METHOD OF MAKING THE SAME

Robert G. Prongay, % Piedmont Engraving Co., Box 2092, Winston-Salem, N.C.
Filed Aug. 28, 1961, Ser. No. 134,453
5 Claims. (Cl. 156—14)

Figure 1:
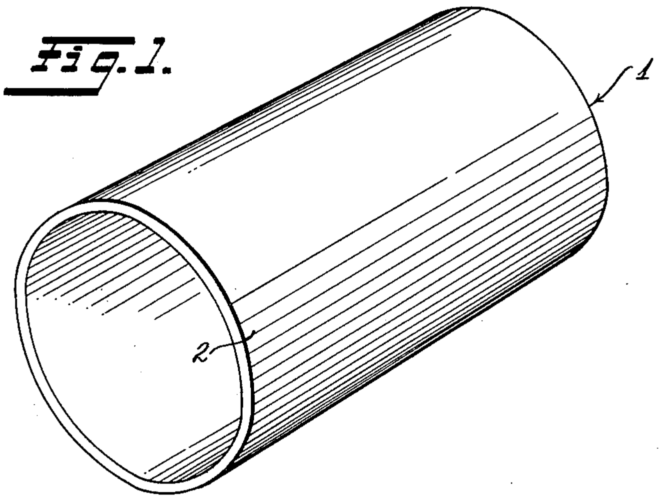

This invention relates generally to a novel printing plate and to a novel method of making cylindrical or other non-planar printing plates, using the so-called "powderless etching" process. Printing plates made in accordance with the teachings of the present invention can be employed in any known printing process, such as letter-press, offset, gravure, dry offset, lithograph or the like.

It has been well known in the art that non-planar printing plates can be manufactured by the conventional powder process, and satisfactory results have been obtained with such metals as bronze, steel, and the like. In manufacturing flat printing plates, however, the powder process has been rendered substantially obsolete by the introduction of the powderless process, which is described, for example, in the patents to Easley et al., 2,640,763 through 2,640,767, and Hopkins et al., 2,828,194. This process may be practiced without the extremely high degree of skill and craftsmanship required in the powder process and the costs involved are much lower since the etching step can be accomplished in about ten minutes as opposed to about an hour and forty-five minutes in the powder process. It is well known, however, that the powderless process cannot be performed satisfactorily on conventional metals. Specific alloys are required, and they must be prepared for the etching process by rolling in an over-under rolling mill whereby a hundred-pound billet, which may be 16 inches by 10 inches by 2½ inches at the start, is compressed into a sheet which is approximately .0625 inch thick. Furthermore the art had never recognized the fact that anything except a flat plate could be processed in the existing powderless equipment.

Accordingly, the powderless process has never been satisfactorily adopted in the production of cylindrical or other non-planar printing plates. No method of preparing non-planar zinc alloy plates had been devised and, even if it had been, no one would have believed that a non-planar plate could be etched by the powderless process.

It is, therefore, a primary objective of the present invention to provide a method for producing cylindrical or other non-planar printing plates which can be etched by the powderless process.

Another object of the present invention is to provide a method for producing non-planar printing plates which can be processed in conventional etching equipment.

A further object of the present invention is to provide a method for economically producing cylindrical printing plates or the like without forming seams therein (with the attendant difficulties in controlling dimensions for accuracy in high-speed printing) and also without deforming the printing surfaces which have been provided thereon.

A still further object of the present invention is to provide a non-planar printing plate which is economical to produce and process and one whose surface, after etching, meets the highest printing requirements of hardness and resistance to wear and deformation.

Figure 2:
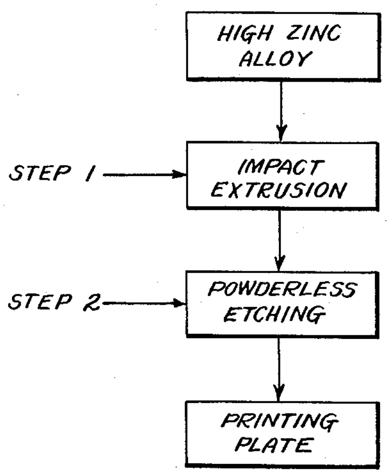

Other objects and advantages will be readily apparent from the following description when taken in conjunction with the accompanying drawings, in which:

FIG. 1 is a perspective view illustrating a printing cylinder prepared for etching in accordance with the present invention; and FIG. 2 is a flow sheet illustrating the major steps involved in the process of the present invention.

In practicing the present invention a material is selected which in the form of a rolled plate can be etched successfully by the powderless process. Zinc and magnesium and their alloys are recognized as having this characteristic and a commercially suitable alloy may contain, for example: 99.65%–99.93% high-quality zinc; 0.05%–0.02% aluminum; 0.02%–0.15% magnesium; and traces of minor alloying elements such as iron, cooper and nickel. This material cannot be etched in its original form, primarily because the surface characteristics are not conducive to the reception of a commercially suitable etch by the powderless etching process. The surface must be hardened to acquire the compacted characteristics of flat plates which have been processed for use in the powderless process by the over-under rolling process referred to above. This is accomplished preferably by forming the metal into a cylinder by a high-impact extrusion step which can be practiced with the use of commerically available high-impact extruding apparatus. Various apparatus which may be employed are disclosed, for example in the patents to Friden, 2,160,963; Ambert, 1,314,037, and Hilton, 2,942,728. In this process the zinc alloy in the form of a billet is placed in the bottom of an extrusion mold and a ram-type press is brought down on the billet under high pressure. This pressure and whatever heat is generated thereby causes the material to flow up the sides of the mold between the inner wall of the mold and the outer wall of the ram element. The resultant cylinder indicated generally by the numeral 1 in FIG. 1, may thus be formed with or without a bottom wall, the ends of the cylinder being trimmed as required. The outer surface 2 of the cylinder acquires the compacted surface characteristics which are necessary to receive the etch.

The final step in the process is the etching itself. In this step the cylinder is selectively coated with an acid-resistant coating or "resist" and one or more cylinders formed and prepared as described hereinabove are suspended by any suitable means above the surface of the etching bath. The etching is performed in the conventional manner, which is described in detail in the aforecited patents to Easley et al. and Hopkins et al. While the etching process is the same and conventional bath apparatus is employed, it should be noted that this step is taken in the face of the clear teaching in the prior art that only flat plates can be etched by the powderless process.

It will be readily apparent that the novel printing plate produced under the present process achieves all of the objectives enumerated hereinabove. It has been particularly useful for high-speed precision printing such as is required to make business machine cards and the like. In this instance, the speed and precision of the printing operation is all important and the only commercially feasible ways of making the required cylindrical plates in the past was by casting or otherwise forming the cylinders by bronze, steel, copper or other metals and etching them of the time-consuming powder process. The present invention enables the production of cylindrical printing plates in a very short period of time and the resultant savings in the cost per plate is significant.

It will be understood that numerous changes and modifications may be made by those skilled in the art in the process described herein without departing from the spirit of the invention of the scope of the following claims.

I claim:

1. A process for forming an etched printing plate from a material selected from the group consisting of zinc-base alloys and magnesium-base alloys capable of receiving a powderless etch after compaction of the surface thereof to be etched, comprising the steps of extruding said material in the form of a seamless cylindrical printing plate to achieve a surface receptive to powderless etching, and etching such surface by the powderless etching process.

2. The process defined in claim 1 wherein said material is formed by impact extrusion.

3. The process of claim 1 wherein said material is a zinc-base alloy containing on the order of 99.3% zinc.

4. A cylindrical printing plate formed by the process set forth in claim 1.

5. A printing plate as provided in claim 4 formed of a zinc-base alloy comprising on the order of 99.65 to 99.93 percent zinc, 0.05 to 0.02 percent aluminum, and 0.02 to 0.15 percent magnesium.

References Cited in the file of this patent

UNITED STATES PATENTS

| | | |
|---|---|---|
| 1,678,231 | Sadtler | July 24, 1928 |
| 2,640,767 | Easley | June 2, 1953 |
| 2,929,752 | Treat et al. | Mar. 22, 1960 |
| 2,942,728 | Hilton | June 28, 1960 |
| 3,048,512 | Nelson | Aug. 7, 1962 |